Sept. 27, 1966  W. R. ISAACS ET AL  3,275,762
AUTOMATIC CIRCUIT CLOSER WITH SPRING BIASED
NORMALLY CLOSED CONTACT STRUCTURE
Filed June 28, 1965  2 Sheets-Sheet 1
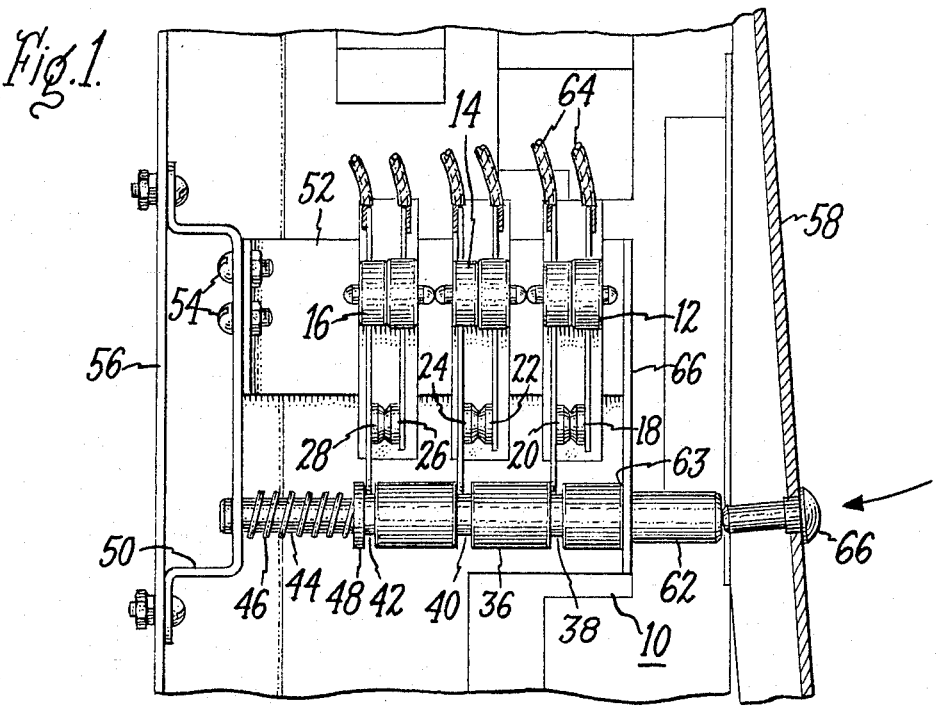
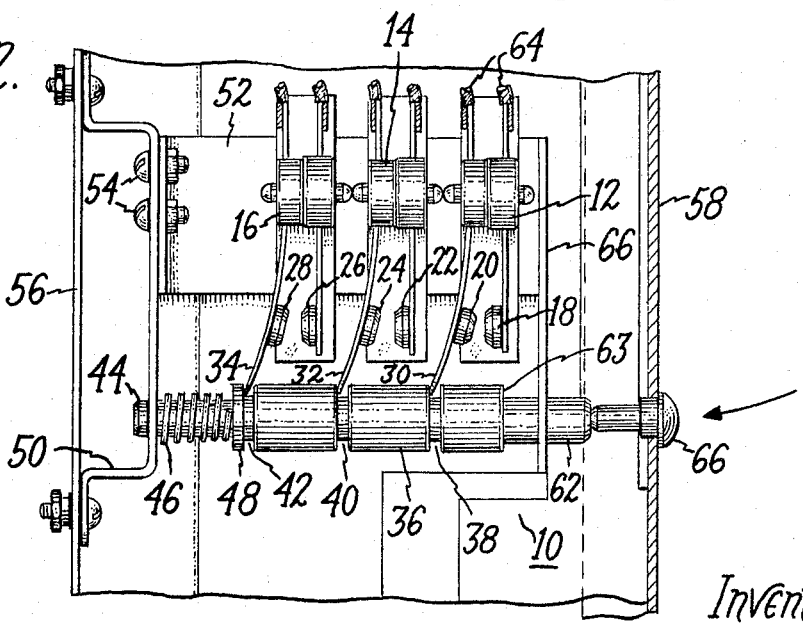
Inventors,
William R. Isaacs,
Kenneth R. Stowe,
by Francis K. Doyle
Their Attorney.

Sept. 27, 1966  W. R. ISAACS ET AL  3,275,762
AUTOMATIC CIRCUIT CLOSER WITH SPRING BIASED
NORMALLY CLOSED CONTACT STRUCTURE
Filed June 28, 1965  2 Sheets-Sheet 2
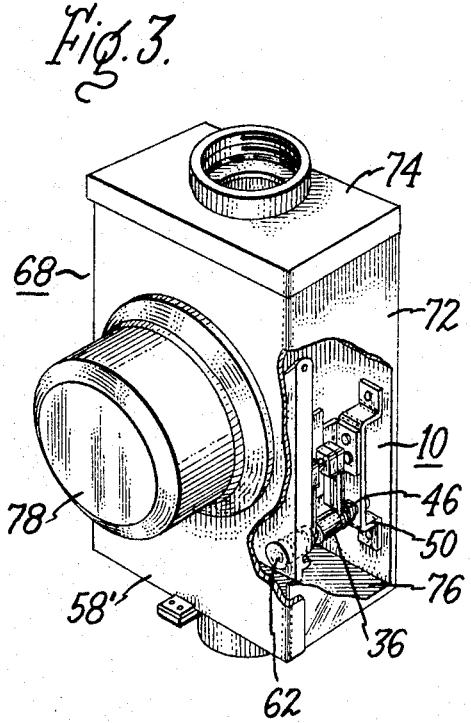
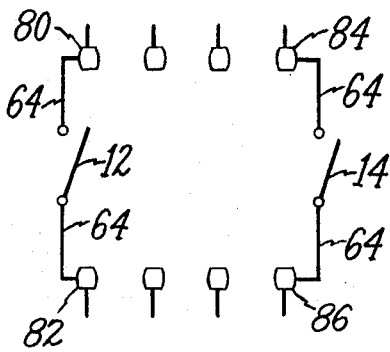
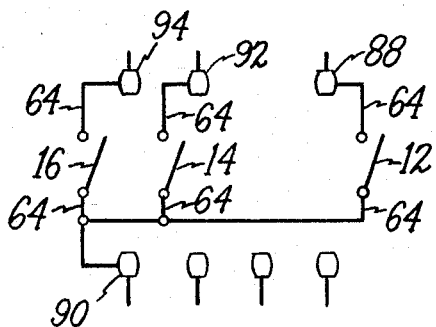
Inventors,
William R. Isaacs,
Kenneth R. Stowe,
by Francis K. Doyle
Their Attorney.

United States Patent Office 3,275,762
Patented Sept. 27, 1966

3,275,762
AUTOMATIC CIRCUIT CLOSER WITH SPRING BIASED NORMALLY CLOSED CONTACT STRUCTURE
William R. Isaacs, Dover, N.H., and Kenneth R. Stowe, South Berwick, Maine, assignors to General Electric Company, a corporation of New York
Filed June 28, 1965, Ser. No. 467,669
1 Claim. (Cl. 200—16)

The invention relates to circuit closing devices and, more particularly, to an automatic circuit closer.

As is well known to those skilled in the art, when instrument transformers are used to energize various types of electrical instruments it is necessary to provide some means for keeping the secondary circuit of the transformer closed at all times. As is well understood, when the secondary circuit is opened for any reason, high voltages are present which may be very dangerous to human life and may also create hazards to other adjacent apparatus.

Of course, as long as the energized instrument is connected into the secondary circuit the secondary circuit will be closed. However, it often becomes necessary to remove the electrical instrument from the secondary circuit. Some reasons for removal are, for example, to test the instrument to calibrate it, or to replace it with another type of instrument. In these instances it is necessary that the secondary circuit of the transformer be maintained closed when the instrument is disconnected. It is desirable that the secondary circuit be closed automatically before the connected transformer can be disconnected. In order to provide an automatic circuit closer, it is desirable to provide a casing in which the instrument is mounted, the casing having a cover to prevent the removal of the instrument, that is, the cover must be removed to disconnect the instrument, for example by withdrawing it from jaw terminals in the casing. Desirably, the removal of the cover should operate the automatic circuit closer to thereby close the transformer secondary circuit before the instrument can be disconnected.

Therefore, it is one object of this invention to provide an automatic circuit closer for use in casings of electrical instruments.

It is a further object of this invention to provide an automatic circuit closed for automatically closing the secondary circuit of an instrument transformer.

A still further object of this invention is to provide an automatic circuit closer which will be automatically operated before an associated electrical instrument can be disconnected from its circuit.

A still further object of this invention is to provide an automatic circuit closer for use in the casing of an electrical instrument in which the circuit closer is operated by the removal or replacement of the cover of the casing.

In carrying out this invention in one form an automatic circuit closer is provided having a plurality of switches spring-pressed into closed position, an operator is provided which is actuated against the force of the spring to open the plurality of switches. In the preferred form of the invention, the operator is actuated by the cover of a casing in which the circuit closer is mounted to open and close the switches of the automatic circuit closer.

The invention which is sought to be protected will be particularly pointed out and distinctly claimed in the claim appended hereto. However, it is believed that this invention and the manner in which its various objects and advantages are obtained, as well as other objects and advantages thereof, will be better understood from the following detailed description of a preferred embodiment thereof particularly when taken in connection with the accompanying drawings, in which:

FIGURE 1 is a plan view of one form of automatic circuit closer according to this invention showing the switches of the closer in closed position;

FIGURE 2 is a view similar to FIG. 1 showing the switches of the automatic circuit closer in open position;

FIGURE 3 is a perspective view with parts broken away of a meter socket showing one form of the automatic circuit closer of this invention mounted therein;

FIGURE 4 is a schematic diagram of the terminals of an eight terminal meter socket showing one use of the circuit closer of this invention; and FIGURE 5 is a schematic diagram of a seven terminal meter socket showing another use of the automatic circuit closer of this invention.

The automatic circuit closer of this invention is designed to be used with electrical instruments which are mounted in the secondary circuit of an instrument transformer to prevent the accidental opening of the secondary circuit of the instrument transformer. Of course, it will be apparent that the automatic circuit closer of this invention could be used in any type of electrical circuit where it is desirable to prevent the circuit from opening due to the removal of an electrical instrument for repair, testing, calibration, replacement or the like. For example, the invention is very useful in many types of meter sockets to prevent interruption of customer service. Of course it is also useful in meter sockets which are used to mount meters placed in the secondary circuit of an instrument transformer. Thus it will be apparent that the description presented is for illustrative purposes only and should not be considered as limiting the invention set forth in the appended claim.

Reference will now be made to the drawings in which like numerals will be used to indicate like parts throughout the various views thereof. Referring first to FIGS. 1 and 2, there is shown a preferred form of the automatic circuit closer of this invention. As shown in FIGS. 1 and 2 the automatic circuit closer 10 comprises a plurality of switches, which switches are spring-pressed into a closed position. The automatic circuit closer 10 is shown as including three switches, switches 12, 14 and 16. Switch 12 is shown with contacts 18 and 20, switch 14 with contacts 22, 24 and switch 16 with contacts 26, 28. In the form of the invention shown in FIGS. 1 and 2, each of contacts 18, 22 and 26 is a fixed contact, while contacts 20, 24 and 28 are movable contacts. As will be understood each of the contacts is preferably mounted on an electrically conductive spring temper copper member to aid in the opening and closing of the contacts. The spring temper copper members on which contacts 20, 24 and 28 are mounted are provided with an extension shown as 30, 32 and 34, respectively. These extensions cooperate with an operator or plunger 36 to open and close switches 12, 14 and 16.

As is shown, the plunger or operator 36 is in the form of a cylindrical member having indented portions or slots 38, 40, 42 which receive, respectively, the extensions 30, 32 and 34. The lower portion of plunger 36 is reduced to form a follower 44 on which is mounted a spring 46. As is apparent from FIGS. 1 and 2, spring 46 butts against the shoulder 48 on operator 36 and against the mounting bracket 50 of the automatic circuit closer 10. Thus as is apparent, the spring 46 holds the plunger 36 in a position to maintain switches 12, 14 and 16 in the closed position as shown in FIG. 1.

As is shown in FIGS. 1 and 2, the switches 12, 14 and 16 are mounted on a plate 52 which is secured to mounting bracket 50 as, for example, by bolts 54. The mounting bracket 50 is secured to the back plate 56 of a casing, the casing being provided with a cover 58. The upper end of the mounting plate 52 is provided with a flange 60 and the flange 60 is provided with an opening (not shown)

through which the reduced upper portion 62 of the plunger or operator 36 is inserted. As will be understood, a shoulder 63 is formed on operator or plunger 36. The shoulder 63 contacts flange 60 when plunger 36 is raised, as in FIG. 1, limiting the upward movement thereof. In a similar manner, the mounting bracket 50 is provided with an opening (not shown) through which the follower 44 at the lower end of plunger 36 is inserted. As will be apparent each of switches 12, 14 and 16 is provided with electrical leads, generally indicated as 64, which may be connected into a desired circuit such as, for example, the secondary circuit of an instrument transformer. Also, as shown, it is desirable that the cover 58 be provided with an operating stud 66 to insure positive operation of the automatic circuit closer without the circuit closer extending beyond the edges of the casing in which it is mounted.

From the above description it is believed that the operation of the automatic circuit closer of this invention will be clearly apparent. As can be seen from FIG. 1, when the cover 58 is removed from the casing, spring 46 will press against shoulder 48 raising the plunger 36. Plunger 36 through the extensions 30, 32 and 34 will close the contacts of switches 12, 14 and 16. When cover 58 is closed, operating stud 66 will engage the upper portion 62 of the operator or plunger 36 forcing the operator or plunger 36 downward against the force of spring 46. Of course, as will be understood, the upper portion 62 will ride through the opening (not shown) in the upper flange 60, while the follower 44 will extend through the opening (not shown) in the mounting bracket 50. As the plunger 36 moves downward against the force of spring 46 it carries the extensions 30, 32 and 34, thereby moving contacts 20, 24 and 28 away from the fixed contacts 18, 22, 36 and opening each of switches 12, 14 and 16.

Referring to FIG. 3 of the drawing, the automatic circuit closer of this invention is shown in use in a meter socket 68. In FIG. 3 the meter socket 68 is shown as having a back wall 70, side walls 72 (only one of which is visible), a top wall 74 and a bottom wall 76. As will be apparent these walls form an open box structure in the manner indicated. The open box structure forming the meter socket 68 is closed by a cover member 58'. In the embodiment shown, the automatic circuit closer 10 is mounted on the back wall 70 by means of the mounting bracket 50 and extends along the side wall 72. As can be seen, the upper portion 62 of operator 36 extends almost to the upper edge of side wall 72. In the manner discussed with reference to FIGS. 1 and 2, an operator stud (not shown) is mounted in the cover 58' and engages the upper portion 62 of operator 36 as cover 58' is closed. This will open the switches of the automatic circuit closer 10 in the manner earlier discussed with reference to FIGS. 1 and 2. When the cover 58' is open the operator stud will move out of contact with portion 62 of operator 36 allowing the spring 46 to close the switches. Thus when the cover 58' is removed the automatic circuit closer 10 will operate to close the switches, allowing meter 78 to be removed without opening the circuit to which it is connected. As will be apparent from FIG. 3 the automatic circuit closer 10 will be readily visible when cover 58' is removed. Thus, the person removing cover 58' can readily ascertain that the circuit has been closed prior to removing the meter 78.

As will be understood, wires 64 from switches 12, 14 and 16 will be connected to appropriate portions of a circuit to provide the desired closed circuit. In general, wires 64 will be connected to appropriate terminals within a meter socket or an electrical instrument case. For example, considering FIG. 4 there is shown the schematic of an eight terminal socket such as may be used in a three phase, three wire circuit. In a three phase, three wire circuit it is only necessary to connect two pairs of terminals to provide a desired closed circuit. As shown in FIG. 4, the terminals 80 and 82 may be closed or electrically connected to each other by means of switch 12 and wires 64—64. In the same manner the terminals 84, 86 may be connected together by means of switch 14 and wires 64—64.

FIGURE 5 shows schematically a seven terminal socket such as may be used in a three phase, four wire circuit. In this type of circuit it is desirable to connect each of three wires to the fourth wire of the circuit. That is, connect three of the terminals to a fourth terminal. As is shown in FIG. 4 this may be accomplished by the automatic circuit closer of this invention. Terminal 88 may be connected to terminal 90 by means of switch 12 and wires 64—64. In the same manner terminal 92 may be connected to terminal 90 by means of switch 14, while the terminal 94 is connected to the terminal 90 by the switch 16.

While there has been shown and described the present preferred embodiment of this invention and the manner of using the same, it will be readily apparent to those skilled in the art that many changes may be made in the structural details without departing from the spirit and scope of the invention, especially as set forth in the appended claim.

What is claimed as new and which it is desired to secure by Letters Patent of the United States is:

An automatic circuit closer for mounting in the casing of an electrical device to be actuated by the cover of the casing comprising, in combination:
 (a) a mounting member for mounting the circuit closer in the casing of an electrical device,
 (b) a plurality of switches,
  (1) said plurality of switches mounted on said mounting member,
  (2) each of said plurality of switches having a fixed contact and a movable contact,
 (c) an operator, said operator movably mounted in said mounting member,
  (1) means connecting said operator to said movable contacts of said plurality of switches,
 (d) spring means mounted on said operator between said mounting member and a shoulder on said operator,
  (1) said spring means acting to hold said operator in a position in which said plurality of switches are closed,
said operator being mounted in said mounting member such that the cover of a casing in which said mounting member is mounted will engage said operator to open said switches when the cover is placed on the casing.

References Cited by the Examiner
UNITED STATES PATENTS

| | | | |
|---|---|---|---|
| 2,649,514 | 8/1953 | Ballou | 200—16 |
| 2,743,351 | 4/1956 | Gorham | 200—61.78 X |
| 2,790,879 | 4/1957 | Ulinski | 200—172 X |
| 2,822,450 | 2/1958 | Goudy et al. | 200—159 X |
| 2,872,535 | 2/1959 | Dahlgren | 200—1 X |
| 2,991,343 | 7/1961 | Norden | 200—159 X |

ROBERT K. SCHAEFER, *Primary Examiner.*

KATHLEEN H. CLAFFY, *Examiner.*

J. R. SCOTT, *Assistant Examiner.*